United States Patent Office 3,843,377
Patented Oct. 22, 1974

3,843,377
ART OF MANUFACTURING MODIFIED AMYLACEOUS MATERIALS WITH CONDENSED PHOSPHATES AND UREA
Richard J. Alexander, Wauwatosa, Wis., assignor to Krause Milling Company, Milwaukee, Wis.
No Drawing. Continuation-in-part of abandoned application Ser. No. 261,644, June 12, 1972. This application May 29, 1973, Ser. No. 364,770
Int. Cl. C08b 1/00
U.S. Cl. 106—157                            8 Claims

ABSTRACT OF THE DISCLOSURE

A series of novel products and a method of producing the same are described in which amylaceous materials, such as refined starches and cereal flours, are treated with condensed phosphates and urea. In addition to catalysing the reactions between the amylaceous materials and condensed phosphates, urea reacts with the amylaceous materials to produce a series of modified products with unusual rheological properties.

This application is a continuation-in-part of application Ser. No. 261,644 filed June 12, 1972, now abandoned.

BACKGROUND OF THE INVENTION

Field of the Invention

The products of the present invention are particularly useful in mineral ore beneficiation, as thickeners, as soil conditioners, as adhesives and binders and as anionic flocculants.

DESCRIPTION OF THE PRIOR ART

Starch phosphate esters have been the subject of numerous patents and articles in the literature. The methods of preparation and applications of most of these materials have been recently described by E. F. Paschall (*Starch: Chemistry and Technology*, Vol. II, Chapter XIV).

The monophosphate esters of starch are generally produced by the reaction of their orthophosphate salts such as sodium dihydrogen phosphate ($NaH_2PO_4$) and disodium hydrogen phosphate ($Na_2HPO_4$) as well as mixtures thereof, or sodium tripolyphosphate ($Na_5P_3O_{10}$). Commercial products made from both types of phosphate salts have been available for several years. Materials are produced from semi-dry or relatively anhydrous reaction systems so that water will not interfere and limit the amount of reaction. Typical procedures for producing these products in the laboratory have been described by E. F. Paschall (*Methods in Carbohydrate Chemistry*, Vol. IV, Chapter VI, Section 67).

Diphosphate esters are produced in reactions with sodium trimetaphosphate ($Na_3P_3O_9$) or sodium hexametaphosphate ($Na_6P_6O_{18}$), or with reagents such as phosphorus pentachloride ($PCl_5$). These reagents are so-called crosslinking reagents because during the reactions with starch at least two starch molecules become bonded to one phosphorus or phosphate molecule. Reactions are generally carried out in aqueous starch slurries with a relatively small amount of crosslinking reagent and controlled temperature and pH.

The use of urea in combination with certain orthophosphates has been described in two different types of starch modifications. The first involves starch, orthophosphate salts and urea in semi-dry reaction systems such as those described by Neukom (U.S. Pat. No. 2,824,870) and Hjermstad (U.S. Pat. No. 3,069,411). These reaction products are believed to be monofunctionally substituted starch esters containing nitrogen substituted phosphate groups, although one author (Neukom) gives no indication that urea enters into the reaction at all.

The second type of modification involves a slurry-type reaction of starch and urea in combination with a mineral acid, such as phosphoric acid (British Pat. No. 977,682, French Pat. No. 1,332,677, Belgian Pat. No. 618,620). The resulting viscosity-reduced materials are used in combination with alum (aluminum sulfate), or with certain aldehydes to produce water insoluble paper coatings. However, there is a question as to whether urea and phosphoric acid actually produce a starch ester comparable to those reported by Hjermstad and Neukom, since other mineral acids apparently can be employed with equal success.

SUMMARY OF THE INVENTION

I have found that when amylaceous materials, such as refined starches and cereal flour, are treated with condensed phosphates in combination with urea or similar nitrogen-containing reagents, a group of products with unexpected properties is produced. For instance, when amylaceous materials are treated with sodium trimetaphosphate and urea, modified products are produced in which a large portion of the substituent groups are monophosphate groups. This is entirely unexpected since sodium trimetaphosphate normally produces diphosphate esters. Products produced by this invention possess properties similar to those prepared with reagents such as sodium tripolyphosphate, with greatly improved rheological properties, such as increased paste viscosity, improved paste clarity and lower apparent gelatinization temperature. The properties usually associated with crosslinked materials made from sodium trimetaphosphate are not present.

I have also found that a series of products can be produced from amylaceous materials with sodium trimetaphosphate and urea in which the products contain varying amounts of both mono- and diphosphate ester groups. This is a definite advantage over prior art, in which both a monophosphate reagent, such as sodium tripolyphosphate, and a crosslinking or diphosphate reagent, such as sodium trimetaphosphate are combined in separate reactions with starch to provide both mono- and diphosphate groups (Kerr and Cleveland, U.S. Pats. Nos. 2,801,242, 2,884,413 and 3,021,222). With my invention one reagent and one reaction system can be used to produce a series of products with a variety of rheological properties by simply increasing or decreasing the reaction temperature.

When amylaceous materials are treated with sodium tripolyphosphate and urea, products are produced with several unexpected properties. In the first place, products are prepared under conditions which are very mild compared to those reported in the prior art. Products possessing greatly improved rheological properties are produced at about 140°–150° C. for 20–30 minutes. In addition, limited amounts of reagents (1–3% sodium tripolyphosphate and 1–3% urea) are employed compared with those reported in the literature.

The combination of mild reaction conditions and low reagent levels result in products with extremely high viscosity and extremely low apparent gelatinization temperatures. In one example, the viscosity of corn starch modified with 2% sodium tripolyphosphate and 3% urea was 6000 cps. at 3% solids compared with 110 cps. for the starting material. The apparent gelatinization temperature was 28° C. compared with 68° C. for the starting material. In many cases these properties can be improved even more by removing unreacted reagents and by-product salts by standard washing techniques, such as filtration or centrifugation of an aqueous slurry of the reaction products.

The role of urea, or similar nitrogen-containing reagents, appears to be quite unique. Urea apparently acts both as a catalyst in promoting more efficient reaction of the amylaceous material with the condensed phosphate and as a reagent in directly modifying the amylaceous material. These phenomena are evidenced by the fact that levels of bound phosphorus are much higher when urea is employed than when products are made without urea, and by the fact that large increases in bound nitrogen are obtained independently of the initial phosphorus level. In addition, release of ammonia during the reactions suggests direct modification of the amylaceous material through the formation of amide bonds. Urea does not react in the manner suggested by Hjermstad (U.S. No. 3,069,411) for reactions of starch with orthophosphates. Instead of forming phosphate esters with nitrogen substituted phosphate groups, the products of this invention are double derivatives of amylaceous materials containing both phosphate and amide groups.

Another unusual feature of this invention is that even with the mild reaction conditions and low reagent levels employed, products can be produced which are cold water soluble or cold water swelling in nature. Cold water soluble starch phosphates have been produced by Neukom in reactions of starch with orthophosphate salt (U.S. No. 2,865,762). However, bound phosphorus levels were quite high (3% to 5% bound phosphorus) and reaction times were extremely long (one to several hours). The products of my invention generally contain less than 0.50% bound phosphorus, frequently less than 0.30% bound phosphorus, and are prepared in 30 minutes or less.

Yet another unique feature of my invention is that products are produced having superior rheological properties as compared to products made using orthophosphate salts in combination with urea. Products made with sodium tripolyphosphate and urea have much higher viscosities and lower gelatinization temperatures than those made with comparable percentages of orthophosphate salts and urea. This is particularly unusual since the products made with sodium tripolyphosphate are not as extensively modified and have lower levels of bound phosphorus than those made with the orthophosphate salts.

At this point a review of the different reactions that are involved in combining orthophosphate salts with starch as opposed to combining condensed phosphate salts with Whistler, *Starch: Chemistry and Technology*, Vol. II, page 354), the orthophosphate reaction with starch involves a *condensation* reaction betwen the hydroxyl group on starch and the hydroxyl group on the phosphate salt. In other words, the hydroxyl group on the phosphate salt is necessary for that type of reaction to occur. There is reason to assume that the reaction of the urea modified phosphate salt (claimed by Hjermstad) with starch occurs in the same manner, as a result of the neutral pH conditions.

With condensed phosphates containing no free hydroxyl groups, however, the reaction is a *substitution* reaction as described by Paschall (page 355) and Kerr (U.S. Pat. No. 2,884,413, column 1, lines 60–72, and column 2, lines 1–19). Because of the alkaline pH conditions, the reaction systems of the present invention are thought to involve this type of reaction in which the condensed phosphate reacts with starch (or protein) in a substitution reaction catalyzed by the presence of urea, and urea reacts with starch (or protein) catalyzed by the presence of the phosphate salt.

DESCRIPTION OF THE INVENTION

My invention may be accomplished by blending an amylaceous material, such as a refined starch or a cereal flour with an aqueous solution of condensed phosphate and urea. After the mixture is dried to remove excess moisture, the starch or flour mixture is heated to 100°–160° C. for 1 to approximately 60 minutes depending upon the heating equipment employed, the reaction being under alkaline pH conditions of pH 8 or greater.

The amount of condensed phosphate may be varied from 1.0 to 6.0%, although I prefer to use 2.0 to 3.0%. In producing monophosphated amylaceous products, I prefer to use sodium tripolyphosphate. However, other straight chain condensed phosphates, such as sodium pyrophosphate, may also be employed. In addition, under the proper conditions, sodium trimetaphosphate may be employed.

In producing diphosphated amylaceous products, or in producing products that contain both mono- and diphosphate groups, I prefer to use sodium trimetaphosphate. However, other condensed phosphates, such as sodium hexametaphosphate, may also be employed.

The amount of urea may be varied from 1.0 to 6.0% although I prefer to use 2.0 to 3.0%. Other similar nitrogen-containing reagents have the following general formula:

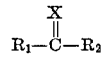

where
$R_1 = H$, $NH_2$ or $N(CH_3)_2$
$R_2 = NH_2$ or $N(CH_3)_2$
$X = O$ or $S$ Typical nitrogen-containing reagents, such as formamide, dimethylformamide, thiourea, tetramethylurea and cyanamide may be substituted for urea in any of the examples which follow, although I prefer to use urea.

The amount of water used to prepare the aqueous solutions of condensed phosphate and urea should be held to a minimum, since excess moisture in the final starch or flour mixture will have to be evaporated before the actual reaction step is carried out. I have found 10–15% aqueous solutions to be convenient.

Before reaction the starch or flour mixture should be dried to about 5% moisture. This will provide a material which is easy to handle in subsequent processing steps, and will limit the amount of hydrolysis of the condensed phosphate. This drying step may be accomplished by any standard procedure, such as flash drying or oven drying.

The dried starch or flour mixture is then heated to 100°–160° C. for 20 to 60 minutes in a forced air oven. Actually, I prefer to use a temperature of 140°–150° C. for 20–30 minutes when employing a forced air oven, since temperatures and times much beyond these limits produce off-colored products. However, time and temperature are interdependent and conditions could be modified over a fairly wide range and still produce acceptable products.

I have also found that time and temperature are highly dependent on the type of processing equipment employed. For instance, I have found an extruder with a 1:1 screw could be used as a means of promoting the reaction. In this case the extruder was actually used to produce rapid heat exchange between the extruder barrel and the starch or flour mixture, and an acceptable product was produced with a retention time of only 75 seconds at about 150° C. Therefore, reaction conditions should not be restricted to those employed throughout most of my work. Other processing equipment, such as the fluid bed drier, vibratory belt reactor, or something as simple as a heated screw conveyor could be used to promote the desired reaction and produce acceptable products.

It should also be pointed out that the reaction temperature is quite important in reactions of amylaceous materials with sodium trimethaphosphate and urea. Products containing almost exclusively monophosphate groups are obtained at temperatures of 110° to 130° C., while products containing more diphosphate groups are obtained at temperatures of 150° to 160° C. using a forced air oven.

My invention is applicable to all amylaceous materials, such as refined starches and cereal flours. The starches or flours may be derived from corn, waxy corn, wheat, sorghum and waxy sorghum varieties, potato, and tapioca and may be modified either before or after the reaction, as with acids, oxidizing agents and the like, and may be gelatinized or ungelatinized.

Because of the complexity of the composition of the modified amylaceous materials there are several chemical reactions which might have taken place. The protein fraction contains various reactive sites at which the reaction probably occurs. Any amino acid within the protein molecules possessing groups which contain an active hydrogen atom, such as an hydroxyl group (present on amino acids threonine, serine and tyrosin), free amino groups (present on amino acids arginine, lysine, histidine, tryptophan and proline) and sulfhydryl groups (present on cysteine), to mention a few, could take part in the reaction with both the condensed phosphates and the urea or similar nitrogen-containing reagent of this invention to produce modified protein molecules having the following general structure:

$$R_1—P_R—R_2$$

where $P_R$ is a protein molecule,
$R_1$ is an amide or substituted amide group, and
$R_2$ is a monophosphate or diphosphate group.

The starch or the starch portion of the creal flours also contains hydroxyl groups at which reaction could occur to produce starch molecules having the following general structure:

$$R_1—R—R_2$$

where

R is a starch molecule,
$R_1$ an amide or substituted amide group, and
$R_2$ a monophosphate or diphosphate group.

TITRATION PROCEDURE FOR PERCENT BOUND PHOSPHORUS

Ten grams (±0.1 g.) of sample is weighed out in a 250 ml. beaker. Then 100 ml. of distilled water is added and the slurry pH adjusted to about 2.0 with 6 N HCl. The slurry is stirred mechanically for about five minutes and then centrifuged in a 250 ml. centrifuge tube at about 1800 r.p.m. (700 g.) for five minutes. The supernate is discarded, the residue mixed thoroughly with 100 ml. of distilled water and the resulting slurry centrifuged. The second supernate is discarded and the residue quantitatively transferred to a 400 ml. beaker with 100 ml. of distilled water. The slurry is then titrated with 0.2 N NaOH and the volumes of NaOH consumed at pH 5.0 and 9.5 recorded (as measured by a standard pH meter).

$$\text{Percent bound phosphorus (db)} = \frac{(A-B) \times N \times 0.31}{D.S.}$$

where

A = ml. of NaOH at pH 9.5
B = ml. of NaOH at pH 5.0
N = normality of NaOH
D.S. = Dry Substance of sample (expressed as a decimal fraction)

Also in the Tables containing Brabender Visco/amylo/Graph data the following procedure was employed using the Brabender Visco/amylo/Graph, Model VAV, with 700 cm.-g. cartridge, made by C. W. Brabender, South Hackensack, N.J.:

BRABENDER VISCO/AMYLO/GRAPH PROCEDURE

The appropriate amount of sample is weighed out in a 600 ml. beaker. Sufficient distilled water is added to give a total weight of 500 g. The resulting slurry is mixed well to give a uniform mixture and quantitatively transferred to the Brabender bowl. The slurry is heated from 25° to 95° at 1½° per minute and held at 95° for 15 minutes. The temperature at which the recorder pen first leaves the base line (initial paste viscosity) has been called the apparent gelatinization temperature. This temperature is recorded along with the peak viscosity (in Brabender units), temperature of the peak viscosity, and the viscosities at 95° (initial and after 15 minutes hold). Sample sizes of 50 g. (10% solids), 40 g. (8% solids), 30 g. (6% solids) and 20 g. (4% solids) were employed in the various patent examples.

EXAMPLES

The following examples illustrate my invention but are not to be considered as limiting its scope. Examples 1–10 illustrate the means by which products made from amylaceous materials with condensed phosphates and urea may be produced.

Example 1

One thousand grams of yellow corn flour was placed in a Hobart mixer and a solution of 30.0 g. of sodium tripolyphosphate and 30.0 g. of urea in 425 ml. of distilled water was added (10 ml. at a time followed by one minute of mixing). After mixing for 20 minutes the flour was dried overnight (16–18 hours) at 50° C. in a forced air oven and finally ground in a Waring Blendor to break up lumps formed on drying. The procedure was repeated until a total of 5000 g. of corn flour had been treated. The flour was then placed on porcelain trays (400 g. per tray), spread out evenly to a depth of about ½ inch and heated at 150° C. for 30 minutes in a forced air oven. The product had a bound phosphorus content of 0.38%.

Example 2

Four hundred grams of waxy sorghum starch was placed in a Hobart mixer and a solution of 8.0 g. of sodium tripolyphosphate and 12.0 g. of urea in 175 ml. of distilled water was added (as in Example 1). After 20 min. of mixing the mixture was dried overnight at 50° C. and ground in a Waring Blendor. It was heated at 150° C. for 30 min. The product contained 0.27% bound phosphorus.

Example 3

Two hundred grams of sorghum starch was placed in a Hobart mixer and a solution of 4.0 g. of sodium tripolyphosphate and 6.0 g. of urea in 100 ml. of distilled water was added. The final dried product was heated at 150° C. for 30 min. The product had a bound phosphorus content of 0.29%.

Example 4

Four hundred grams of waxy sorghum flour was placed in a Hobart mixer and a solution of 12.0 g. of sodium tripolyphosphate and 12.0 g. of urea in 175 ml. of distilled water was added. The final dried product was heated at 140° C. for 30 min. Bound phosphorus content, 0.27%.

Example 5

The procedure for Example 4 was repeated with white sorghum flour. Bound phosphorus content, 0.31%.

Brabender Visco/amylo/Graph data for the products and starting materials in Examples 1–5 are shown in Table I.

TABLE I

Brabender Visco/amylo/Graph Data of Unpurified Products and Starting Materials from Examples 1–5

| Product | Percent solids (d.b.) | Brabender data ||||
|---|---|---|---|---|---|
| | | Apparent gel. temp. (° C.) | Peak viscosity at temp. (° C.) | Viscosity at— ||
| | | | | 95° (init.) | 95° (15 min.) |
| Corn flour | 10.0 | 70 | 820 at 95° | 820 | 770 |
| Example 1 | 10.0 | 43 | 2,010 at 69° | 1,600 | 1,490 |
| Waxy sorghum starch | 4.0 | 70 | 190 at 95° | 180 | 165 |
| Example 2 | 4.0 | 34 | 1,290 at 65° | 1,140 | 1,060 |
| Sorghum starch | 6.0 | 70 | 245 at 94° | 240 | 180 |
| Example 3 | 6.0 | (a) | 2,170 at 58° | 1,140 | 1,050 |
| Waxy sorghum flour | 8.0 | 67 | 640 at 84° | 550 | 400 |
| Example 4 | 8.0 | 43 | 1,190 at 79° | 1,110 | 1,070 |
| White sorghum flour | 10.0 | 70 | 380° at 95° | 360 | 345 |
| Example 5 | 10.0 | 55 | 910 at 85° | 810 | 740 | a Product had an initial viscosity of 10 B. U. at 25° C.

Example 6

Fifteen hundred grams of yellow corn flour was placed in a Hobart mixer and a solution of 45.0 g. of sodium trimetaphosphate and 45.0 g. or urea in 350 ml. of distilled water was added. After mixing for 20 min. the flour mixture was dried overnight at 50° C. and ground in a Waring Blendor. Then, 300 g. samples of the flour were heated at 105°, 120°, 135° and 150° C. for 30 min. Brabender data for the starting material (flour plus reagents) and products are shown in Table II. The data illustrate the change from a product made at 120° C. which is similar to those made with sodium tripolyphosphate, to products made above 120° C., which possess increasing amounts of crosslinking.

TABLE II

Brabender Visco/amylo/Graph Data of Unpurified Products from Example 6 at 10% Solids

| | Brabender data | | | |
|---|---|---|---|---|
| | Apparent gel. temp. (° C.) | Peak viscosity at temp. (° C.) | Viscosity at— | |
| | | | 95° (init.) | 95° (15 min.) |
| Reaction temp. (° C.): | | | | |
|  | 70 | 1,050 at 95°.. | 1,050 | 870 |
| 105 | 69 | 1,170 at 94°.. | 1,170 | 1,000 |
| 120 | 64 | 1,440 at 91°.. | 1,430 | 1,370 |
| 135 | 55 | (a) | 1,740 | 1,880 |
| 150 | 40 | (a) | 400 | 800 | a Product had no peak viscosity under the conditions of the test.

Example 7

Four hundred grams of waxy sorghum starch was placed in a Hobart mixer and a solution of 12.0 g. of sodium trimetaphosphate and 12.0 g. of urea in 150 ml. of distilled water was added. After mixing, drying and grinding (as in previous examples), the material was heated at 140° C. for 30 min. The product had a bound phosphorus content of 0.07%. Brabender data are shown in Table IV.

Example 8

The procedure for Example 7 was repeated using 400 g. of pearl corn starch. The product had a bound phosphorus content of 0.07%. Brabender data are shown in Table IV.

TABLE III

Composition of Products from Example 6

| | Percent bound | | |
|---|---|---|---|
| | Nitrogen (d.b.) | Ash (d.b.) | Phosphorus (d.b.) |
| Reaction temp. (° C.): | | | |
|  | 1.10 | 0.37 | 0.00 |
| 105 | 1.13 | .45 | .03 |
| 120 | 1.44 | .79 | .08 |
| 135 | 1.61 | 1.99 | .21 |
| 150 | 1.82 | 3.20 | .35 |

TABLE IV

Brabender visco/amylo/graph data of starting materials and purified products of Examples 7 and 8

| | | Brabender data | | | |
|---|---|---|---|---|---|
| | | Apparent gel. temp. (° C.) | Peak viscosity at temp. (° C.) | Viscosity at— | |
| Product | Percent solids | | | 95° (init.) | 95° (15 min.) |
| Waxy sorghum starch. | 6.0 | 69 | 660 at 85°.. | 520 | 400 |
| Example 7 | 6.0 | 54 | 2,070 at 70°.. | 1,810 | 1,750 |
| Pearl corn starch. | 8.0 | 70 | 680 at 95°.. | 680 | 610 |
| Example 8 | 8.0 | 58 | 1,840 at 76°.. | 1,480 | 1,440 |

Example 9

Five 400 g. samples of yellow corn flour were treated with several condensed phosphates and several urea-like reagents in reactions at 150° C. for 30 min. by a procedure similar to that described in Example 7. The reagents and quantities used are listed in Table V. The Brabender data are shown in Table VI.

TABLE V

Reagents, quantities and bound phosphorus values of products made in Example 9

| Product | Condensed phosphate reagent | Percent | Nitrogen-containing reagent | Percent | Percent bound phosphorus (d.b.) |
|---|---|---|---|---|---|
| 9A | Sodium hexametaphosphate | 3.0 | Urea | 3.0 | 0.17 |
| 9B | Sodium trimetaphosphate | 3.0 | Thiourea | 3.0 | .40 |
| 9C | Sodium pyrophosphate | 3.0 | Urea | 3.0 | .27 |
| 9D | Sodium tripolyphosphate | 3.0 | Thiourea | 3.0 | .30 |
| 9E | do | 3.0 | Tetramethyl urea | 3.0 | .27 |

TABLE VI

Brabender visco/amylo/graph data of purified products from Example 9

| | | Brabender data | | | |
|---|---|---|---|---|---|
| | | Apparent gel temp. (° C.) | Peak viscosity at Temp. (° C.) | Viscosity at— | |
| Product | Percent solids | | | 95° (init.) | 95° (15 min.) |
| Corn flour | 8.0 | 67 | (a) | 350 | 360 |
| 9A | 8.0 | 52 | 1,070 at 79°.. | 1,000 | 980 |
| 9B | 8.0 | 54 | (a) | 365 | 445 |
| 9D | 8.0 | 50 | 2,120 at 65°.. | 1,190 | 1,100 |
| 9E | 8.0 | 52 | 1,670 at 68°.. | 1,070 | 960 |
| Corn flour | 6.0 | 67 | (a) | 120 | 130 |
| 9C | 6.0 | 39 | 1,510 at 60°.. | 930 | 900 | a Product had no peak viscosity under conditions of the test.

Example 10

One thousand grams of yellow corn flour was placed in a Hobart mixer and a solution of 30.0 g. of sodium tripolyphosphate and 30.0 g. of urea in 425 ml. of distilled water was added. After 20 min. of mixing the flour was dried overnight at 50° C. and ground in a Waring Blendor. Then 300 g. samples were processed in a Wayne laboratory extruder using a 1:1 screw with front and back barrel temperatures of 150° C. for various periods of time. The reaction conditions employed are shown in Table VII and the Brabender data in Table VIII.

TABLE VII

Reaction conditions and bound phosphorus values for products made in Example 10

| Motor setting | Screw speed, r.p.m. | Residence time (seconds) | Percent bound phosphorus (d.b.) |
|---|---|---|---|
| 8 | 52 | 29 | 0.13 |
| 4 | 36 | 42 | .20 |
| 1 | 20 | 75 | .30 |

TABLE VIII

Brabender visco/amylo/graph data of unrefined products from Example 10 at 10% solids

| | Apparent gel temp. (° C.) | Peak viscosity at temp. (° C.) | Viscosity at— | |
|---|---|---|---|---|
| Residence time (seconds) | | | 95° (init.) | 95° (15 min.) |
| Starting material | 69 | 830 at 90°.. | 770 | 550 |
| 29 | 64 | 1,120 at 85°.. | 930 | 640 |
| 42 | 57 | 1,550 at 79°.. | 1,280 | 950 |
| 75 | 46 | 2,180 at 72°.. | 1,600 | 1,320 |

The following examples and associated tables illustrate the novelty of the present invention:

Example 11

A. One thousand grams of yellow corn flour was placed in a Hobart mixer and a solution of 30.0 g. of sodium tripolyphosphate in 250 ml. of distilled water was added to the flour (10 ml. at a time followed by one minute of mixing at low speed). After all the solution had been added the flour was mixed for 20 minutes and then dried overnight at 50° C. in a forced air oven.

After the dried flour mixture was ground in a Waring Blendor to break up any lumps that may have formed on drying, it was heated at 150° C. in a forced air oven. The product had a bound phosphorus content of 0.25%.

B. The experiment was repeated except a solution of 30.0 g. of sodium tripolyphosphate and 30.0 g. of urea in 450 ml. of distilled water was added to the flour. The final product had a bound phosphorus content of 0.37%.

The bound phosphorus values and the Brabender data shown in Table IX illustrate the novelty of using urea in reactions of sodium tripolyphosphate with corn flour.

Example 12

A. Four hundred grams of pearl corn starch was placed in a Hobart mixer and a solution of 8.0 g. of sodium tripolyphosphate in 100 ml. of distilled water was added. After mixing for 20 min. the mixture was dried overnight at 50° C. and ground in a Waring Blendor. It was finally heated at 150° C. for 30 min. The product contained 0.20% bound phosphorus.

B. The experiment was repeated except a solution of 8.0 g. of sodium tripolyphosphate and 12.0 g. of urea in 175 ml. of distilled water was added to the flour. The final product had a bound phosphorus content of 0.26%.

The bound phosphorus values and the Brabender data shown in Table IX illustrate the novelty of using urea in reactions of sodium tripolyphosphate with corn starch.

TABLE IX

Brabender visco/amylo/graph data of unrefined products and starting materials from Examples 11 and 12

| Product | Percent solids (d.b.) | Apparent gel temp. (°C.) | Peak viscosity at temp. (°C.) | 95° (init.) | 95° (15 min.) |
|---|---|---|---|---|---|
| Corn flour | 10.0 | 70 | 820 at 95° | 820 | 770 |
| Example 11A | 10.0 | 56 | 1,510 at 80° | 1,340 | 1,210 |
| Example 11B | 10.0 | 40 | 2,240 at 70° | 1,790 | 1,680 |
| Corn starch | 6.0 | 73 | 260 at 95° | 240 | 240 |
| Example 12A | 6.0 | 55 | 650 at 74° | 490 | 440 |
| Example 12B | 6.0 | 33 | 1,930 at 59° | 1,210 | 1,100 |

Example 13

In this example the similarity between products made with 3% sodium tripolyphosphate and 3% sodium trimetaphosphate is demonstrated. A product was prepared from corn flour according to the procedure in Example 1. A second product was made from corn flour according to the procedure in Example 6 using a reaction temperature of 125° C. Both products were washed free of unreacted and by-product salts. As can be seen in Table X viscosities of the materials were quite similar.

TABLE X

Brabender visco/amylo/graph data of purified products from Example 13 at 8% solids

| Reagents employed | Peak viscosity at temp. (°C.) | 95° (init.) | 95° (hold) |
|---|---|---|---|
| 3% sodium tripolyphosphate and 3% urea | 2,630 at 61° | 1,620 | 1,540 |
| 3% sodium trimetaphosphate and 3% urea | 2,220 at 70° | 1,870 | 1,640 |

Example 14

In this example the superior properties of products made with sodium tripolyphosphate over those made with orthophosphate salts are demonstrated.

A. Four hundred grams of pearl corn starch was placed in a Hobart mixer and a solution of 8.0 g. of sodium tripolyphosphate and 12.0 g. of urea in 150 ml. of distilled water was added. After mixing for 20 min. the starch mixture was dried overnight at 50° C. and ground in a Waring Blendor. It was finally heated at 150° C. for 30 min. Bound phosphorus, 0.12%.

B. Part A was repeated using 5.1 g. of $NaH_2PO_4 \cdot H_2O$ and 3.8 g. of $Na_2HPO_4$ instead of the sodium tripolyphosphate. Bound phosphorus, 0.19%.

The viscosity characteristics of the product of Part A are clearly superior as shown in Table XI.

TABLE XI

Brabender visco/amylo/graph data of purified products from Example 14 at 4.0% solids

| Product | Reagent | Apparent gel temp. (°C.) | Peak viscosity at temp. (°C.) | Viscosity at 95° (init.) | Viscosity at 95° (15 min.) |
|---|---|---|---|---|---|
| Corn starch | None | 85 | (a) | 20 | 40 |
| Example 14A | 2% sodium tripolyphosphate and 3% urea | 31 | 1,720 at 52° | 710 | 650 |
| Example 14B | 2% orthophosphate salts and 3% urea | 50 | 820 at 67° | 410 | 370 | a Product had no peak viscosity under conditions of the test.

Example 15

Samples of the reaction products made according to Examples 11B and 12B were washed free of residual urea and sodium tripolyphosphate and by-product salts. The purified products had superior rheological properties when compared to the unpurified materials as shown in Table XII.

TABLE XII

Brabender visco/amylo/graph data of purified and unpurified products from Examples 11B and 12B

| Product | Percent solids | Apparent gel temp. (°C.) | Peak viscosity at temp. (°C.) | Viscosity at 95° (init.) | Viscosity at 95° (15 min.) |
|---|---|---|---|---|---|
| Example 11B: | | | | | |
| Unpurified | 8.0 | 44 | 1,260 at 77° | 1,125 | 1,090 |
| Purified | 8.0 | 40 | 2,630 at 61° | 1,620 | 1,540 |
| Example 12B: | | | | | |
| Unpurified | 6.0 | 46 | (a) | 410 | 455 |
| Purified | 6.0 | 37 | 2,080 at 61° | 1,350 | 1,190 | a Product had no peak viscosity under conditions employed in the test.

Example 16

In this example the role of urea in promoting reactions of amylaceous materials with condensed phosphates is demonstrated.

Six 400-gram samples of yellow corn flour were treated with 2.0 and 3.0% sodium tripolyphosphate and with 1.0, 2.0 and 3.0% urea by procedures similar to that disclosed in Example 1. The products were purified to remove unreacted reagents and by-product salts and were analyzed for percent Kjeldahl nitrogen and percent ash according to standard procedures. The results shown in Table XIII suggest that the reactions between the phosphate and corn flour and urea and corn flour took place independently of the concentration of the other reagent, indicating the formation of double derivatives containing both phosphate and amide groups.

TABLE XIII

Reagent levels and bound nitrogen and ash values for purified products from Example 16

| | Percent | | |
|---|---|---|---|
| | Urea | Bound nitrogen | Bound ash |
| Tripolyphosphate: | | | |
| 2.0 | 1.0 | 1.35 | 1.81 |
| 2.0 | 2.0 | 1.54 | 1.64 |
| 2.0 | 3.0 | 1.74 | 1.54 |
| 3.0 | 1.0 | 1.34 | 2.66 |
| 3.0 | 2.0 | 1.50 | 2.55 |
| 3.0 | 3.0 | 1.68 | 2.85 |

Example 17

This example demonstrates the novelty of products made from amylaceous materials, sodium trimetaphosphate and urea in accordance with my invention over those made from sodium trimetaphosphate in a slurry reaction.

A. Three hundred grams of corn flour was placed in a Hobart mixer and treated with a solution of 9.0 g. of sodium trimetaphosphate and 9.0 g. of urea in 75 ml. of distilled water. The flour was then processed by the procedure described in Example 6 with a reaction temperature of 135° C.

B. One thousand grams of corn flour was slurried into 1750 ml. of distilled water and the slurry pH was adjusted to 11.0 with 2.5 N NaOH. The slurry was placed in a 3-liter round bottom flask in a water bath at 50° C. and 30.0 g. of sodium trimetaphosphate and 30.0 g. of urea was added. After 2 hours a 500 ml. aliquot was removed, the slurry pH adjusted to 6.0 with 6 N HCl, the slurry filtered and the filter cake washed with 250 ml. of distilled water. The product was dried overnight at 50° C.

Brabender data in Table XIV shows the superior characteristics of lower apparent gel temperature and higher paste viscosity for product 17A.

TABLE XIV

Brabender visco/amylo/graph data for purified products from Example 17 at 8% solids

| Product | Apparent gel temp. (° C.) | Peak viscosity at temp. (° C.) | Viscosity at— | |
|---|---|---|---|---|
| | | | 95° (init.) | 95° (15 min.) |
| 17A | 59 | (a) | 1,800 | 1,890 |
| 17B | 70 | (a) | 940 | 970 | a Product had no peak viscosity under conditions employed in the test

I claim:

1. A method of manufacturing a phosphated amylaceous product of improved rheological properties comprising blending an amylaceous material with an aqueous solution of condensed phosphate and with a nitrogen-containing reagent selected from the group comprising urea, formamide, dimethylformamide, thiourea, tetramethylurea and cyanamide, said amylaceous material being selected from the group comprising corn, waxy corn, wheat, sorghum, and waxy sorghum starch and flour, said flour containing both protein molecules and starch molecules, the condensed phosphate being in an amount equal to 1.0–6.0% of the mixture, and the nitrogen-containing reagent being in an amount equal to 1.0–6.0% of the mixture, drying the mixture to remove excess moisture, and heating the mixture to a temperature within the range of 100° C.–160° C., the reaction being under alkaline pH conditions of pH 8 or greater.

2. A method as defined in Claim 1 in which the condensed phosphate is selected from the group comprising sodium tripolyphosphate, sodium pyrophosphate, sodium trimetaphosphate, and sodium hexametaphosphate.

3. A method as defined in Claim 1 in which the amount of condensed phosphate is 2.0%–3.0%, and in which the amount of urea or similar nitrogen-containing reagent is 2.0%–3.0%.

4. A method as defined in Claim 1 in which the condensed phosphate is sodium trimetaphosphate, and in which the nitrogen-containing reagent is urea.

5. A method as defined in Claim 1 in which the condensed phosphate is sodium tripolyphosphate, and in which the nitrogen-containing reagent is urea.

6. As a new amylaceous product, a double derivative of an amylaceous material containing both monophosphate and amide groups in which the starch molecules have the following general structure:

$$H_2NCO-R-OPO_3X_2$$

where
X=Na or H
R=a starch selected from the class comprising corn, waxy corn, wheat, sorghum, waxy sorghum, potato and tapioca and in which the protein molecules have the following general structure:

$$H_2NCO-P_R-OPO_3X_2$$

where
X=Na or H
$P_R$=Protein molecule said product being prepared by blending an amylaceous material with an aqueous solution of condensed phosphate and with urea or similar nitrogen-containing reagent, said amylaceous material being selected from the group comprising corn, waxy corn, wheat, sorghum, and waxy sorghum starch and flour, the condensed phosphate being in an amount equal to 1.0–6.0% of the mixture, and the urea or similar nitrogen containing reagent being in an amount equal to 1.0–6.0% of the mixture, drying the mixture to remove excess moisture, and heating the mixture to a temperature within the range of 100° C.–160° C., the reaction being under alkaline pH conditions.

7. As a new amylaceous product, a double derivative of an amylaceous material containing both diphosphate and amide groups in which the starch molecules have the following general structure:

$$R-OPO_3X-R-CONH_2$$

where
X=Na or H
R=a starch selected from the class comprising corn, waxy corn, wheat, sorghum, waxy sorghum, potato and tapioca and in which the protein molecules have the following general structure:

$$P_R-OPO_3X-P_R-CONH_2$$

where
X=Na or H
$P_R$=Protein molecule said product being prepared by blending an amylaceous material with an aqueous solution of condensed phosphate and with urea or similar nitrogen-containing reagent, said amylaceous material being selected from the group comprising corn, waxy corn, wheat, sorghum, and waxy sorghum starch and flour, the condensed phosphate being in an amount equal to 1.0–6.0% of the mixture, and the urea or similar nitrogen containing reagent being in an amount equal to 1.0–6.0% of the mixture, drying the mixture to remove excess moisture, and heating the mixture to a temperature within the range of 100° C.–160° C., the reaction being under alkaline pH conditions.

8. As a new amylaceous product, a derivative of an amylaceous material containing a mixture of mono- and di-phosphate groups, and also containing amide groups as indicated by the following general structure:

$$R-OPO_3X-R(OPO_3X_2)(CONH_2)$$

where
X=Na or H
R=a starch selected from the class comprising corn, waxy corn, wheat, sorghum, waxy sorghum, potato and tapioca and in which the protein molecules have the following general structure:

$$P_R-OPO_3X-P_R(OPO_3X_2)(CONH_2)$$

where
X=Na or H
P=Protein molecule said product being prepared by blending an amylaceous material with an aqueous solution of condensed phosphate and with urea or similar nitrogen-containing reagent, said amylaceous material being selected from the group comprising corn, waxy corn, wheat, sorghum, and waxy sorghum starch and flour, the condensed phosphate being in an amount equal to 1.0-6.0% of the mixture, and the urea or similar nitrogen containing reagent being in an amount equal to 1.0-6.0% of the mixture, drying the mixture to remove excess moisture, and heating the mixture to a temperature within the range of 100° C.–160° C., the reaction being under alkaline pH conditions.

References Cited
UNITED STATES PATENTS

| | | | |
|---|---|---|---|
| 2,824,870 | 2/1958 | Neukom | 260—233.5 |
| 3,069,411 | 12/1962 | Hjermstad | 260—233.5 |

MELVYN I. MARQUIS, Primary Examiner

U.S. Cl. X.R.

260—233.3 R, 233.5

UNITED STATES PATENT OFFICE
CERTIFICATE OF CORRECTION

Patent No. 3,843,377          Dated October 22, 1974

Inventor(s) Richard J. Alexander

It is certified that error appears in the above-identified patent and that said Letters Patent are hereby corrected as shown below:

Column 1, line 41, "their" should read -- either --.

Column 3, line 43, after "with" insert -- starch is important. As pointed out by Paschall (in --.

Signed and sealed this 21st day of January 1975.

(SEAL)
Attest:

McCOY M. GIBSON JR.  
Attesting Officer

C. MARSHALL DANN  
Commissioner of Patents